United States Patent
Yoshigaki et al.

(10) Patent No.: US 11,520,102 B2
(45) Date of Patent: Dec. 6, 2022

(54) PLANAR ILLUMINATION DEVICE COMPRISING ONE OR MORE OPTICAL SHEETS HAVING AN ANISOTROPIC COEFFICIENT OF LINEAR THERMAL EXPANSION

(71) Applicant: MINEBEA MITSUMI Inc., Nagano (JP)

(72) Inventors: Nobuhiko Yoshigaki, Kitasaku-gun (JP); Kazumasa Adachi, Kitasaku-gun (JP)

(73) Assignee: MINEBEA MITSUMI Inc., Nagano (JP)

(*) Notice: Subject to any disclaimer, the term of this patent is extended or adjusted under 35 U.S.C. 154(b) by 0 days.

(21) Appl. No.: 17/453,662

(22) Filed: Nov. 5, 2021

(65) Prior Publication Data
US 2022/0163718 A1      May 26, 2022

(30) Foreign Application Priority Data
Nov. 20, 2020  (JP) .............................. JP2020-193190

(51) Int. Cl.
*F21V 8/00* (2006.01)
*G02F 1/1333* (2006.01)

(52) U.S. Cl.
CPC ........... *G02B 6/0088* (2013.01); *G02B 6/005* (2013.01); *G02B 6/0066* (2013.01); *G02F 1/133314* (2021.01)

(58) Field of Classification Search
CPC ........................ G02B 6/0088; G02F 1/133314

USPC ................................................... 362/632–634
See application file for complete search history.

(56) References Cited

U.S. PATENT DOCUMENTS

| 2002/0191131 | A1  | 12/2002 | Ota et al. | |
| 2014/0247398 | A1* | 9/2014  | Kakimoto  | G02B 6/0088 362/633 |
| 2016/0334567 | A1  | 11/2016 | Kunimochi | |
| 2021/0405431 | A1* | 12/2021 | Yang ................. | G02F 1/133512 |
| 2022/0187528 | A1* | 6/2022  | Zhou ................... | G02B 6/0055 |

FOREIGN PATENT DOCUMENTS

| JP | 2003-005160 A | 1/2003 |
| JP | 2016-213090 A | 12/2016 |

\* cited by examiner

*Primary Examiner* — Keith G. Delahoussaye
(74) *Attorney, Agent, or Firm* — Pearne & Gordon LLP

(57) ABSTRACT

A planar illumination device of an embodiment includes a light guide plate, a light source, one or more optical sheets, a bottom frame, and a top frame. The light guide plate receives light from a light incident side surface. The light source emits light to the light incident side surface of the light guide plate. The optical sheet is disposed on a light exit surface side of the light guide plate. The bottom frame houses the light guide plate, the light source, and the optical sheet. The top frame includes an opening, engages with the bottom frame and covers a light exit surface side of the optical sheet. An end portion on an opening side of a side wall of the bottom frame forms a space with a frame portion of the top frame, where the space corresponds to a clearance for an end portion of the optical sheet.

10 Claims, 5 Drawing Sheets

PLANAR ILLUMINATION DEVICE COMPRISING ONE OR MORE OPTICAL SHEETS HAVING AN ANISOTROPIC COEFFICIENT OF LINEAR THERMAL EXPANSION

CROSS-REFERENCE TO RELATED APPLICATIONS

This application claims the benefit of priority to Japanese Patent Application Number 2020-193190 filed on Nov. 20, 2020. The entire contents of the above-identified application are hereby incorporated by reference.

TECHNICAL FIELD

The present invention relates to a planar illumination device.

BACKGROUND

A planar illumination device known as an edge-light planar illumination device receives light from a light incident side surface of a light guide plate and emits light from a main surface of the light guide plate (for example, see JP 2003-5160 and JP 2016-213090). Such a planar illumination device is used as, for example, a backlight in a liquid crystal display device.

In a typical planar illumination device, a top frame provided with an opening for light emission is often used as part of a housing, and the portion of the top frame that forms the opening for light emission is referred to as a frame. In recent years, to achieve better design, there has been a demand for narrowing the frame width, that is, frame narrowing.

Note that because components of the planar illumination device such as the light guide plate and the optical sheet expand and contract according to temperature, a clearance is required between side walls of a bottom frame that houses the components and the light guide plate and the optical sheet. If the clearance is too small, it is not possible to cater for the expansion and contraction of the light guide plate and the optical sheet and it is difficult to support these components. This leads to degradation in the optical characteristics. In addition, having a large clearance makes frame narrowing difficult.

Note that the coefficient of linear thermal expansion of a Dual Brightness Enhancement Film (DBEF) often used as an optical sheet has anisotropy with respect to two perpendicular directions, and because the coefficient of linear thermal expansion on the large side is a value greater than the coefficient of linear thermal expansion of a typical light guide plate, the relationship between the optical sheet and the bottom frame dominates the clearance design.

SUMMARY

However, optimization to achieve frame narrowing has already been made in terms of the placement of the optical sheet in a typical bottom frame, and further frame narrowing is difficult.

In light of the foregoing, the present invention is directed at providing a planar illumination device capable of further frame narrowing.

To solve the problem described above and achieve the object described above, a planar illumination device according to an aspect of the present invention includes a light guide plate, a light source, one or more optical sheets, a bottom frame, and a top frame. The light guide plate receives light from a light incident side surface. The light source emits light to the light incident side surface of the light guide plate. The optical sheet is disposed on a light exit surface side of the light guide plate. The bottom frame houses the light guide plate, the light source, and the optical sheet. The top frame includes an opening, engages with the bottom frame and covers a light exit surface side of the optical sheet. An end portion on an opening side of a side wall of the bottom frame forms a space with a frame portion of the top frame, where the space corresponds to a clearance for an end portion of the optical sheet.

This planar illumination device according to an aspect of the present invention allows for further frame narrowing of the planar illumination device.

DESCRIPTION OF EMBODIMENTS

Figure 1:
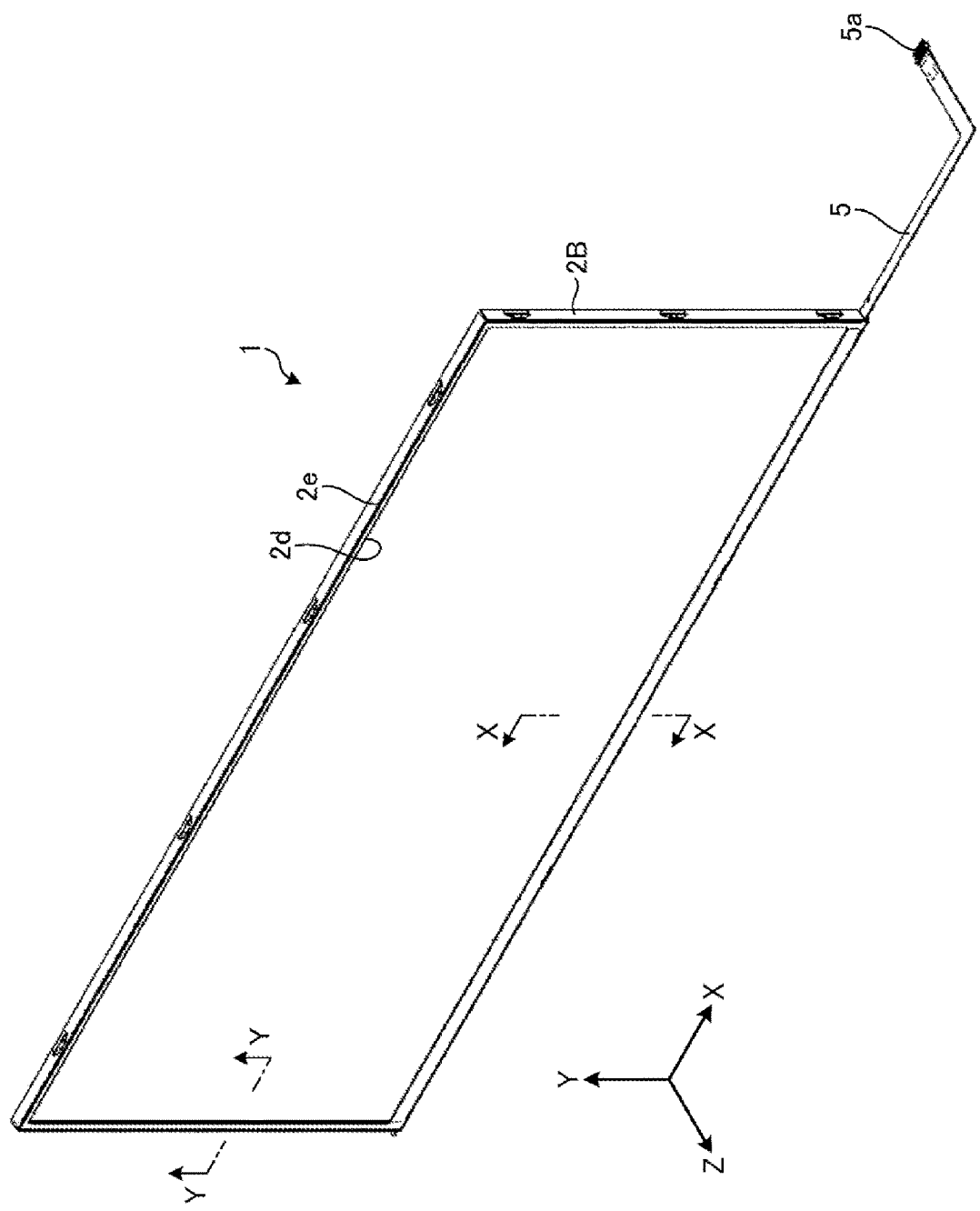
FIG. 1 is an external perspective view of a planar illumination device according to an embodiment.

A planar illumination device according to an embodiment will be described below with reference to the drawings. Note that the present invention is not limited to the embodiment described above. Further, the dimensional relationships, proportions, and the like between elements in the drawings may differ from reality. Among the drawings, portions having mutually different dimensional relationships and proportions may be included. Furthermore, the contents described in one embodiment or modified example are applied in principle to other embodiments or modified examples.

FIG. 1 is a perspective view of a planar illumination device 1 according to one embodiment, as seen from the side of a light exit surface. In FIG. 1, for the sake of convenience, the direction along the long side of a housing of the planar illumination device 1 is the X-axis direction, the direction along the short side of the housing is the Y-axis direction, and the direction along the thickness of the housing is the Z-axis direction.

In FIG. 1, the planar illumination device 1 has a substantially rectangular (in the illustrated example, a substantially rectangular shape is used, but a substantially square shape may also be used) plate-like shape, and a top frame 2B is exposed at an end portion on the side of a light exit surface illustrated at the front in the diagram. A bottom frame (2A) is located on the non-illustrated rear surface side in the diagram. An opening 2d from which light exits is formed inside the top frame 2B. A portion surrounding the opening 2d corresponds to a frame portion 2e. In addition, a portion of a light source substrate 5 is provided extending from the planar illumination device 1 in the positive X-axis direction. A connection portion 5a used for electrical connection to the outside is provided on the tip of the light source substrate 5. The top frame 2B is formed from a sheet metal made of stainless steel or the like. In a case where the planar illumination device 1 is used as a backlight of a liquid crystal display device or the like, the liquid crystal display device or the like is installed on the side where the opening 2d and the frame portion 2e are located.

Figure 2:
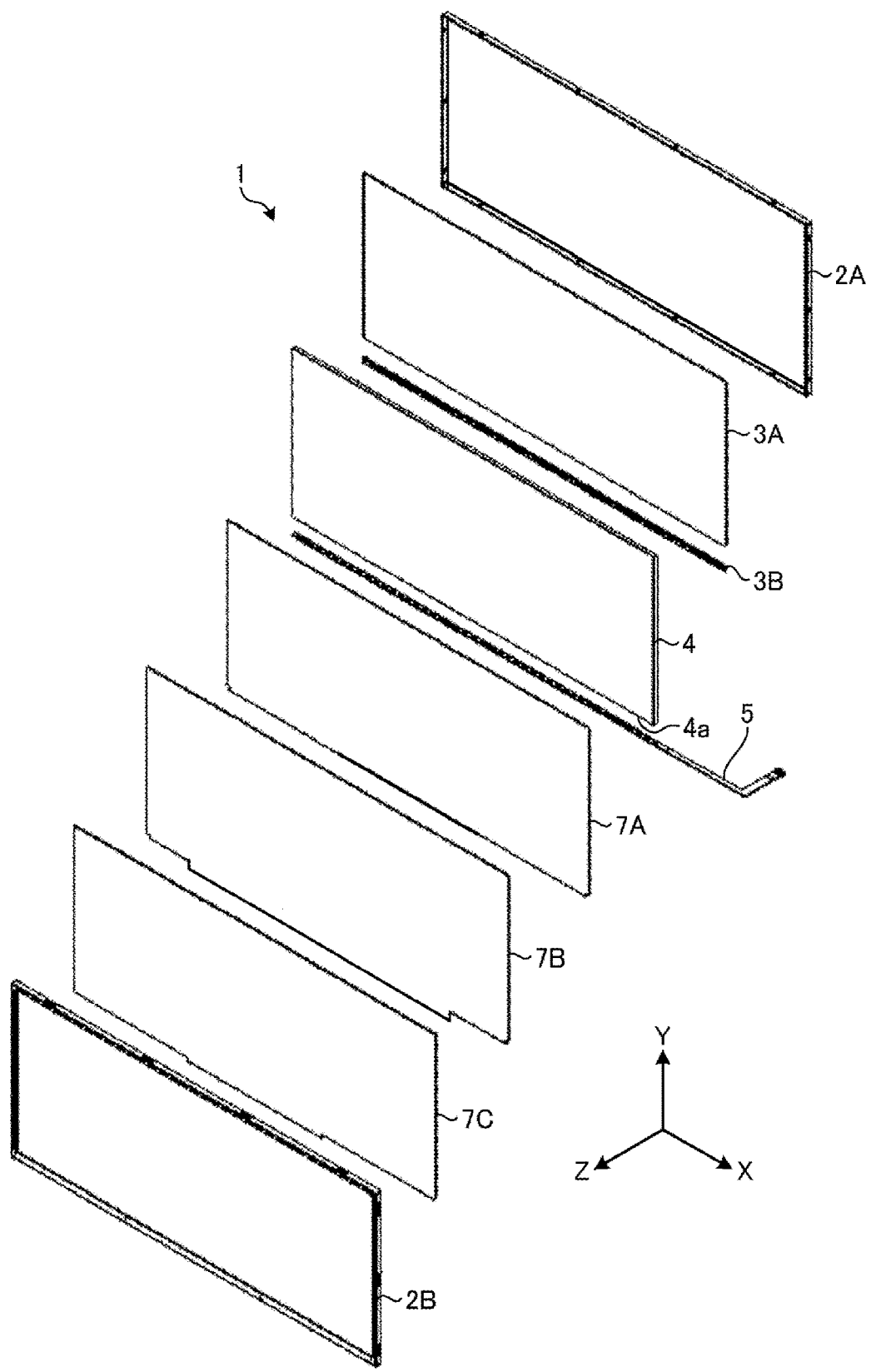
FIG. 2 is an exploded perspective view of main components of the planar illumination device.

FIG. 2 is an exploded perspective view of main components of the planar illumination device 1 as seen from the side of a light exit surface as in FIG. 1. As in FIG. 2, the planar illumination device 1 includes a reflector 3A and a partial reflector base portion 3B, a light guide plate 4 and the light source substrate 5, and optical sheets 7A to 7C stacked in this order from the bottom frame 2A at the top of the diagram, with the top frame 2B serving as a lid on top of these components.

Figure 3:
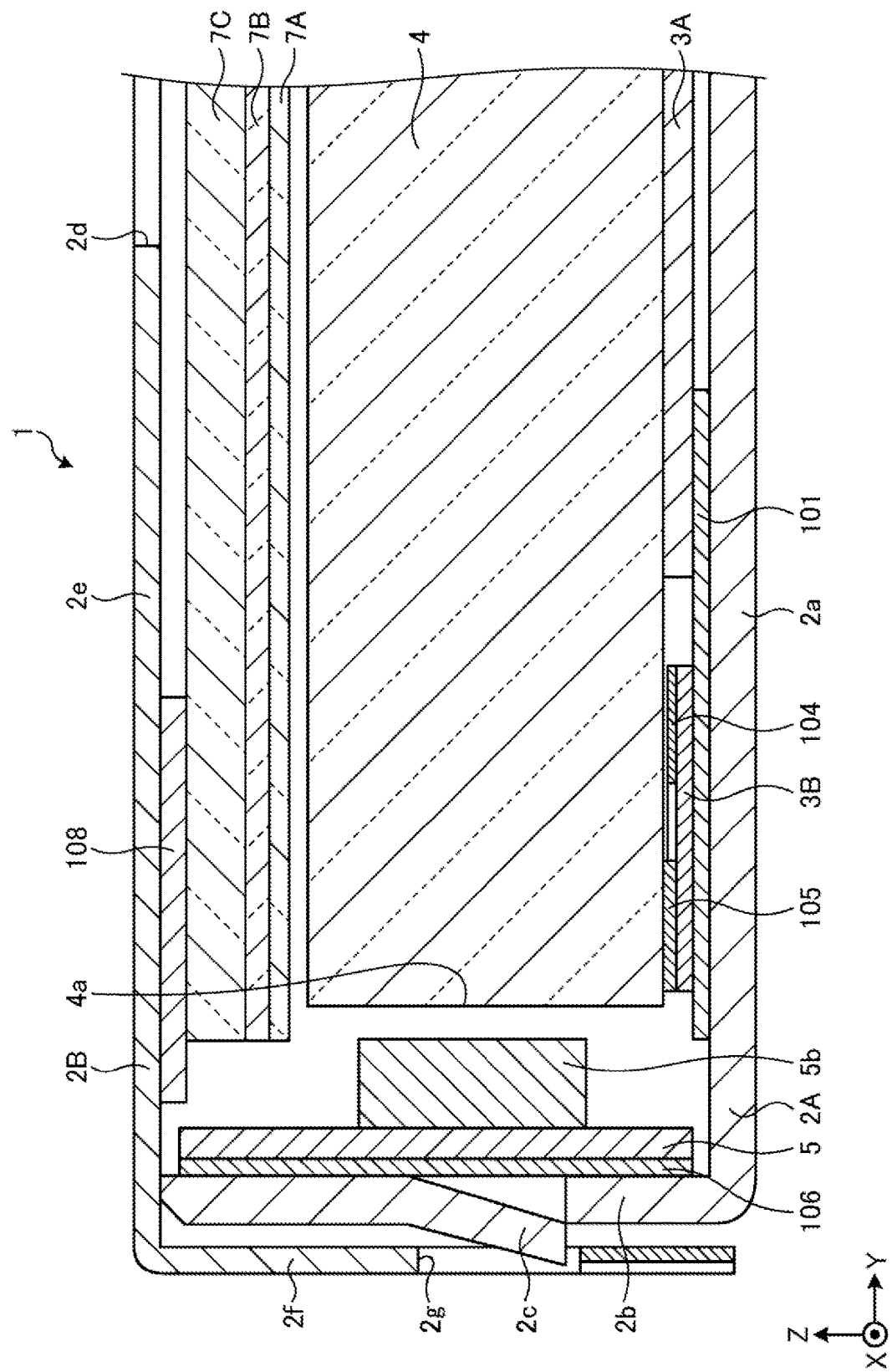
FIG. 3 is a cross-sectional view taken along line X-X of the planar illumination device in FIG. 1.
Figure 4:
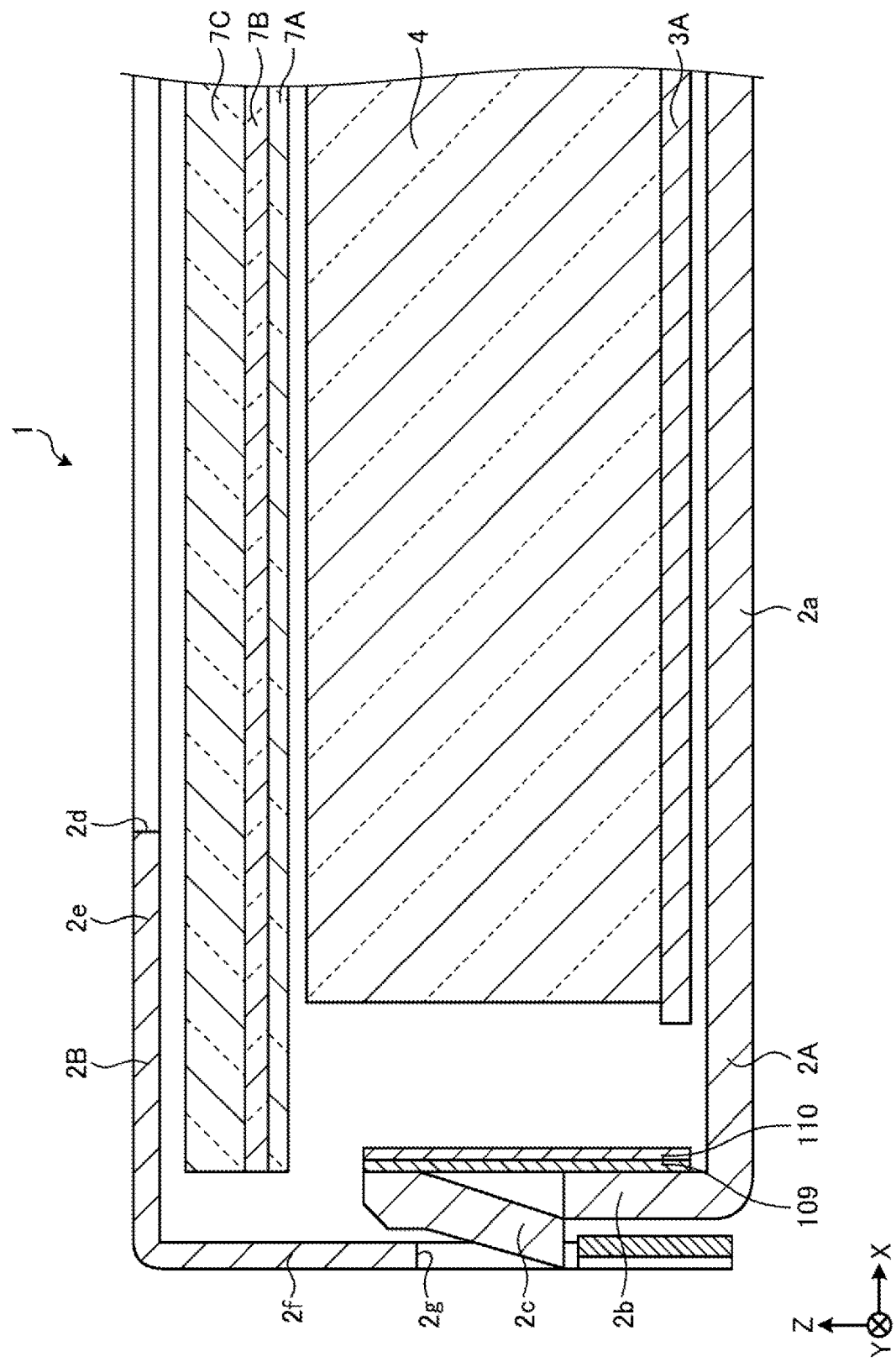
FIG. 4 is a cross-sectional view taken along line Y-Y of the planar illumination device in FIG. 1.

FIG. 3 is a cross-sectional view taken along line X-X of the planar illumination device 1 in FIG. 1, and FIG. 4 is a cross-sectional view taken along line Y-Y of the planar illumination device 1 in FIG. 1.

The bottom frame 2A includes a bottom portion 2a and four side walls 2b surrounding the bottom portion 2a. The top frame 2B includes the frame portion 2e in which the opening 2d is formed and four side walls 2f surrounding the frame portion 2e. In the side wall 2b of the bottom frame 2A, a projection portion 2c formed by, for example, bending a cut portion of the side wall 2b is provided, and when the top frame 2B is installed on the bottom frame 2A, the projection portion 2c of the side wall 2b of the bottom frame 2A engages with a hole 2g provided in the side wall 2f of the top frame 2B. At the side not on the light incident side (FIG. 4), a reflector 110 is affixed to the inner surface of the side wall 2b of the bottom frame 2A via a fixing member 109 made of double-sided tape or the like. Note that, instead of the fixing member 109 and the reflector 110, the end portion of the reflector 3A may be bent and a portion of the reflector 3A may be disposed between a side surface of the light guide plate 4 other than a light incident side surface 4a and the side wall 2b of the bottom frame 2A. Furthermore, instead of the fixing member 109 and the reflector 110, a reflector member separate from the reflector 3A may be affixed to a side surface of the light guide plate 4 other than the light incident side surface 4a.

The light guide plate 4 is an optical member in which light incident on the light incident side surface 4a is guided into the interior and the light exits from a main surface on the side opposite the reflector 3A. The light guide plate 4 is made of a transparent resin such as polycarbonate. At the side on the light incident side (FIG. 3), the light source substrate 5 is fixed to the bottom frame 2A on the side of the light incident side surface 4a of the light guide plate 4 via a fixing member 106 made of double-sided tape or the like. The light source substrate 5 is formed of a flexible printed circuit (FPC) or the like. A light source 5b such as a plurality of LEDs is disposed along the length direction of the light incident side surface 4a at a portion where the light source substrate 5 faces the light incident side surface 4a. Note that while a top-view type LED that emits light from the top surface is used in the illustrated example, a side-view type LED that emits light from a side surface may be used.

At the side on the light incident side (FIG. 3), the reflector 3A and the partial reflector base portion 3B are disposed between the light guide plate 4 and the bottom portion 2a of the bottom frame 2A. An end portion of the reflector 3A and the partial reflector base portion 3B are fixed to the bottom portion 2a of the bottom frame 2A via a fixing member 101 such as white double-sided tape having strong adhesion. The partial reflector base portion 3B is fixed to the light guide plate 4 via a fixing member 105 made of a thermocompression tape or the like, and a base member 104 is disposed around the fixing member 105. The fixing member 105 is arranged in a discrete island-like pattern avoiding portions facing the light source 5b to decrease influence on the optical characteristics of the light guide plate 4 (influence on the optical characteristics due to total reflection at the contact surface between the fixing member 105 and the light guide plate 4), and the comb-shaped base material 104 surrounds the periphery of the fixing member 105. The base member 104 is fixed (adhered) to the partial reflector base portion 3B and is not fixed (adhered) to the light guide plate 4. With such a configuration, the light guide plate 4 is fixed to the bottom frame 2A on the light incident side. The reflector 3A, the fixing member 101, and the base member 104 function as an optical member that reflects light that has leaked to a surface of the light guide plate 4 opposite the light exit surface and emits the light to the light exit surface side.

The optical sheet 7A is an optical member such as a diffuser sheet. The optical sheet 7B is an optical member that functions as a prism sheet, such as a Brightness Enhancement Film (BEF). The optical sheet 7C is an optical member that functions as a reflective polarizer film, such as a Dual Brightness Enhancement Film (DBEF). At the side on the light incident side (FIG. 3), the end portions of the optical sheets 7A to 7C are fixed to the rear surface of the frame portion 2e of the top frame 2B via a fixing member 108 made of double-sided tape or the like. In other words, the optical sheets 7A to 7C are fixed to the top frame 2B on the side on the light incident side, in a similar manner to the light guide plate 4.

As can be seen from FIGS. 3 and 4, the height of the side wall 2b of the bottom frame 2A is different between the side on the light incident side (FIG. 3) and the side perpendicular to the side on the light incident side (FIG. 4). That is, at the side on the light incident side (FIG. 3), the side wall 2b of the bottom frame 2A has a height that reaches the rear surface of the frame portion 2e of the top frame 2B. However, at the side perpendicular to the side on the light incident side (FIG. 4), the side wall 2b of the bottom frame 2A has a height that does not reach the optical sheet 7A.

This difference is due to the relationship between the long side and the short side of the light guide plate 4 and the optical sheets 7A to 7C and the anisotropy of the coefficient of linear thermal expansion of the DBEF used, for example, as the optical sheet 7C. A coefficient of linear thermal expansion $\alpha 1$ in one axial direction of the DBEF and a coefficient of linear thermal expansion $\alpha 2$ in an axial direction perpendicular to the coefficient of linear thermal expansion $\alpha 1$ have the relationship $\alpha 1 < \alpha 2$, where $\alpha 1 = 5.6 \times 10^{-5}/K$ and $\alpha 2 = 8 \times 10^{-5}/K$. The axial direction of the DBEF needs to be aligned with the axial direction of the polarizing plate on the planar illumination device 1 side of a liquid crystal panel to be installed on the light exit surface side of the planar illumination device 1. Thus, typically, the axial direction of the DBEF with the large coefficient of linear thermal expansion $\alpha 2$ is allocated to the long side direction (X-axis direction) of the planar illumination device 1. Thus, expansion and contraction in the long side direction (X-axis direction) is dominated by the optical sheets 7A to 7C, and considering the clearance here is important for achieving frame narrowing in the long side direction (X-axis direction).

Note that in the short side direction (Y-axis direction) of the planar illumination device 1, a typical coefficient of linear thermal expansion $\alpha$ of the light guide plate 4 is isotropic, for example $\alpha = 6.5 \times 10^{-5}/K$, and is greater than the coefficient of linear thermal expansion $\alpha 1$ of the DBEF. Thus, expansion and contraction in the short side direction (Y-axis direction) is dominated by the light guide plate 4. However, the amount of expansion and contraction of the light guide plate 4 is low due to it being on the short side, and thus the clearance here has little effect on achieving frame narrowing. Thus, in the present embodiment, no adjustments to the height of the side wall 2b of the bottom frame 2A have been performed for the short side direction (Y-axis direction).

Accordingly, in a case where the direction of the liquid crystal panel to be mounted is changed to a direction perpendicular to this direction, an adjustment to the height of the side wall 2b of the bottom frame 2A is performed for the short side direction (Y-axis direction). However, in a case where the light guide plate 4 and the optical sheets 7A to 7C are fixed at the side on the light incident side, it is not necessary to adjust the height of the side wall 2b of the bottom frame 2A at the side on the light incident side. Additionally, the height of the side wall 2b of the bottom frame 2A in both the long side direction (X-axis direction) and the short side direction (Y-axis direction) may be adjusted. In this case as well, if the light guide plate 4 and the optical sheets 7A to 7C are fixed at the side on the light incident side, it is not necessary to adjust the height of the side wall 2b of the bottom frame 2A at the side on the light incident side.

Figure 5:
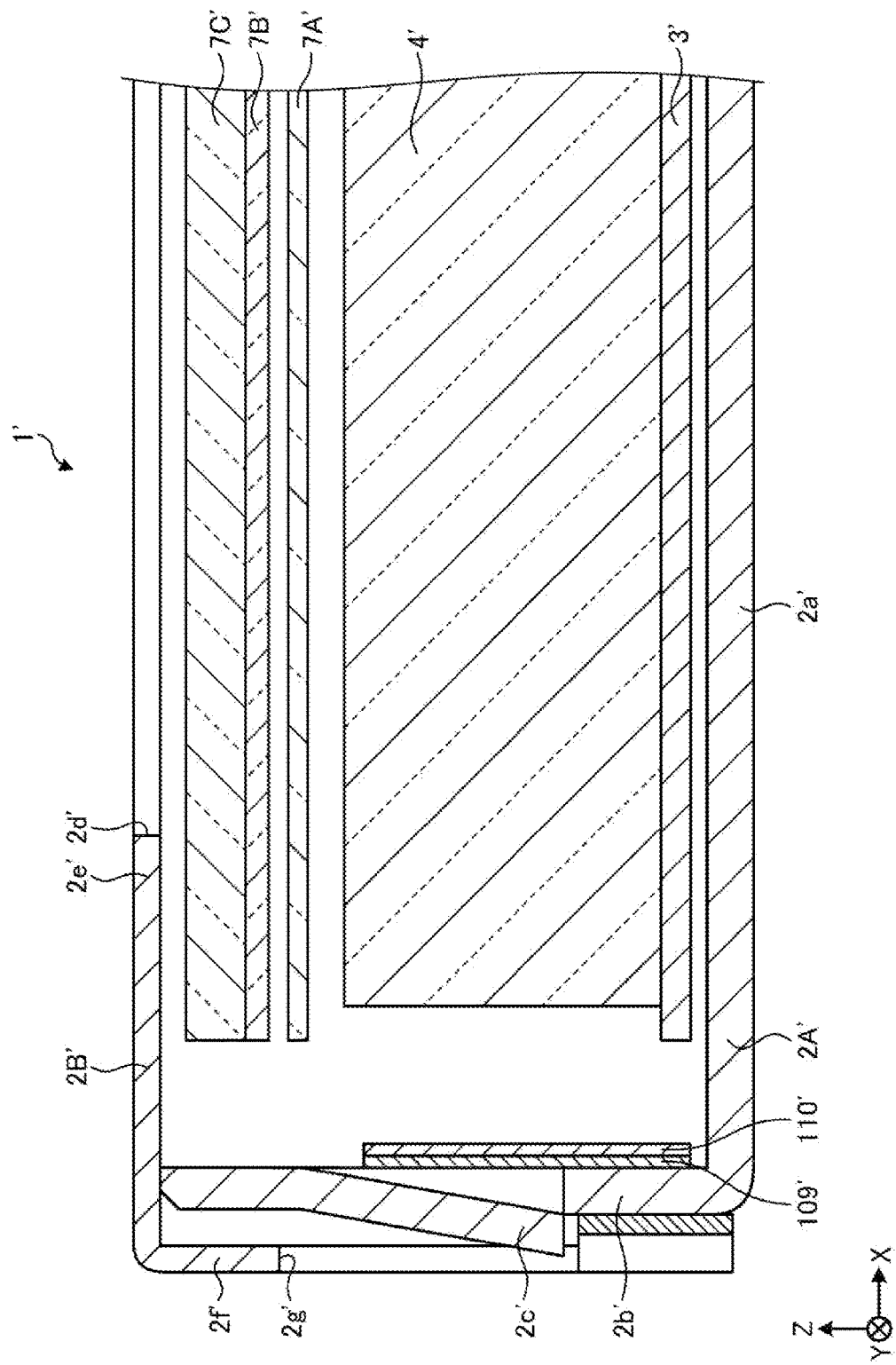
FIG. 5 is a cross-sectional view of a planar illumination device of a comparative example.

FIG. 5 is a cross-sectional view of a planar illumination device 1' of a comparative example, corresponding to the cross-sectional view of a side perpendicular to the side on the light incident side of FIG. 4. In FIG. 5, a bottom frame 2A', a top frame 2B', a bottom portion 2a', a side wall 2b', a projection portion 2c', an opening 2d', a frame portion 2e', a side wall 2f', a hole 2g', a reflector 3', a light guide plate 4', optical sheets 7A' to 7C', a fixing member 109', and a reflector 110' respectively correspond to the bottom frame 2A, the top frame 2B, the bottom portion 2a, the side wall 2b, the projection portion 2c, the opening 2d, the frame portion 2e, the side wall 2f, the hole 2g, the reflector 3A, the light guide plate 4, the optical sheets 7A to 7C, the fixing member 109, and the reflector 110.

In FIG. 5, the side wall 2b' of the bottom frame 2A' has a height that reaches the rear surface of the frame portion 2e' of the top frame 2B'. Thus, the clearance for expansion and contraction of the optical sheets 7A' to 7C' is a distance from the end portions of the optical sheets 7A' to 7C' to the side wall 2b' of the bottom frame 2A'. On the other hand, in the embodiment illustrated in FIG. 4, an opening-side end portion of the side wall 2b of the bottom frame 2A forms a space with the frame portion 2e of the top frame 2B that corresponds to the clearance for the end portions of the optical sheets 7A to 7C. Thus, the end portions of the optical sheets 7A to 7C can be brought close to the side wall 2b of the bottom frame 2A and the side wall 2f of the top frame 2B. As a result, the opening 2d of the top frame 2B can be provided shifted toward the side wall 2f, allowing frame narrowing to be achieved. In a specific design by the inventors, the thickness of the side wall 2b of the bottom frame 2A was reduced by 0.3 mm and the clearance for engagement between the bottom frame 2A and the top frame 2B was reduced by 0.1 mm, thus achieving a total of 0.4 mm of frame narrowing.

Embodiments of the present invention have been described above, but the present invention is not limited to the embodiments described above, and various modifications are possible without departing from the spirit of the present invention.

As described above, a planar illumination device according to an embodiment includes a light guide plate that receives light from a light incident side surface; a light source that emits light to the light incident side surface of the light guide plate; one or more optical sheets disposed on a light exit surface side of the light guide plate; a bottom frame that houses the light guide plate, the light source, and the one or more optical sheets; and a top frame including an opening, the top frame engaging with the bottom frame and covering a light exit surface side of the one or more optical sheets, wherein an end portion on an opening side of a side wall of the bottom frame forms a space with a frame portion of the top frame, the space corresponding to a clearance for an end portion of the one or more optical sheets. This configuration allows for further frame narrowing of the planar illumination device.

Also, in a case where the light guide plate in a plan view has a rectangular shape with a long side and a short side, and any one of the one or more optical sheets has an anisotropic coefficient of linear thermal expansion, an end portion on an opening side of a side wall of the bottom frame at a side perpendicular to an axial direction with the larger coefficient of linear thermal expansion forms a space with the frame portion of the top frame, the space corresponding to a clearance for the end portion of the optical sheet. In this manner, adjustments for frame narrowing can be applied to effective locations.

Furthermore, the axial direction with the larger coefficient of linear thermal expansion is a long side direction of the light guide plate. This configuration allows for frame narrowing on the short side of the planar illumination device.

Further, the larger coefficient of linear thermal expansion of the optical sheet having anisotropy is greater than a coefficient of linear thermal expansion of the light guide plate. Thus, the present invention can be applied to a DBEF that is widely used as an optical sheet.

Furthermore, a height of the side wall of the bottom frame facing the short side of the light guide plate is less than a height of the side wall of the bottom frame facing the long side of the light guide plate. In this manner, adjustments for frame narrowing can be applied to effective locations.

Further, a height of the side wall of the bottom frame facing the short side of the light guide plate is a height that does not reach the optical sheet. In this manner, sufficient space for clearance for the end portion of the optical sheet can be formed.

A configuration obtained by appropriately combining the above-mentioned constituent elements is also included in the present invention. Further effects and modifications can be easily derived by a person skilled in the art. Thus, a wide range of aspects of the present invention is not limited to the embodiment described above, and may be modified variously.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A planar illumination device, comprising:
   a light guide plate that receives light from a light incident side surface;
   a light source that emits light to the light incident side surface of the light guide plate;
   one or more optical sheets disposed on a light exit surface side of the light guide plate;

a bottom frame that houses the light guide plate, the light source, and the optical sheet, the bottom frame comprising a plurality of side walls; and a top frame including an opening, the top frame engaging with the bottom frame and covering a light exit surface side of the optical sheet, wherein in a case where the light guide plate in a plan view has a substantially rectangular shape with a long side and a short side and any one of the one or more optical sheets has an anisotropic coefficient of linear thermal expansion, an end portion on an opening side of at least one side wall of the bottom frame at a side perpendicular to an axial direction with the larger coefficient of linear thermal expansion forms a space with a frame portion of the top frame, the space corresponding to a clearance for an end portion of the optical sheet, an inner surface of the top frame and an outer surface of the bottom frame face each other, and on the side wall forming the space, the top frame and the optical sheet face each other without another member.

2. A planar illumination device, comprising:
a light guide plate that receives light from a light incident side surface;
a light source that emits light to the light incident side surface of the light guide plate;
one or more optical sheets disposed on a light exit surface side of the light guide plate;
a bottom frame that houses the light guide plate, the light source, and the optical sheet, the bottom frame comprising a plurality of side walls; and
a top frame including an opening, the top frame engaging with the bottom frame and covering a light exit surface side of the optical sheet, wherein
an end portion on an opening side of at least one side wall of the bottom frame forms a space with a frame portion of the top frame, the space corresponding to a clearance for an end portion of the optical sheet,
an end portion on an opening side of at least another side wall of the bottom frame is proximate to the frame portion of the top frame such that a space corresponding to a clearance for an end portion of the optical sheet is not formed,
an inner surface of the top frame and an outer surface of the bottom frame face each other, and
on the side wall forming the space, the top frame and the optical sheet face each other without another member.

3. The planar illumination device according to claim 2, wherein
the axial direction with the larger coefficient of linear thermal expansion is a long side direction of the light guide plate.

4. The planar illumination device according to claim 2, wherein
the larger coefficient of linear thermal expansion of the optical sheet having anisotropy is greater than a coefficient of linear thermal expansion of the light guide plate.

5. The planar illumination device according to claim 3, wherein
the bottom frame is surrounded by the side wall forming the space facing the short side of the light guide plate, another side wall facing the short side of the light guide plate, and two other side walls facing the long side of the light guide plate, and a height of either of the side walls of the bottom frame facing the short side of the light guide plate is less than a height of either of the side walls of the bottom frame facing the long side of the light guide plate.

6. The planar illumination device according to claim 3, wherein
the bottom frame is surrounded by the side wall facing the short side of the light guide plate, another side wall facing the short side of the light guide plate, and two other side walls facing the long side of the light guide plate, and
a height of either of the side walls of the bottom frame facing the short side of the light guide plate is a height that does not reach the optical sheet.

7. A planar illumination device, comprising:
a light guide plate that receives light from a light incident side surface;
a light source that emits light to the light incident side surface of the light guide plate;
one or more optical sheets disposed on a light exit surface side of the light guide plate;
a bottom frame that houses the light guide plate, the light source, and the optical sheet, the bottom frame comprising a plurality of side walls; and
a top frame including an opening, the top frame engaging with the bottom frame and covering a light exit surface side of the optical sheet, wherein
an end portion on an opening side of at least one side wall of the bottom frame forms a space with a frame portion of the top frame, the space corresponding to a clearance for an end portion of the optical sheet,
an end portion on an opening side of at least another side wall of the bottom frame is proximate to the frame portion of the top frame such that a space corresponding to a clearance for an end portion of the optical sheet is not formed, and
the height of the one of the side walls does not reach the optical sheet.

8. The planar illumination device according to claim 2, wherein a height of the one side wall of the bottom frame forming the space corresponding to the clearance for an end portion of the optical sheet is lower than a height of the another side wall of the bottom frame not forming the space corresponding to a clearance for an end portion of the optical sheet.

9. The planar illumination device according to claim 7, wherein a height of the one side wall of the bottom frame forming the space corresponding to the clearance for an end portion of the optical sheet is lower than a height of the another side wall of the bottom frame not forming the space corresponding to a clearance for an end portion of the optical sheet.

10. The planar illumination device according to claim 7, wherein
in a case where the light guide plate in a plan view has a substantially rectangular shape with a long side and a short side and any one of the one or more optical sheets has an anisotropic coefficient of linear thermal expansion, and
an end portion on an opening side of a side wall of the bottom frame at a side perpendicular to an axial direction with the larger coefficient of linear thermal expansion forms a space with the frame portion of the top frame, the space corresponding to a clearance for the end portion of the optical sheet.

* * * * *